United States Patent [19]

Nicholls

[11] Patent Number: 4,532,790
[45] Date of Patent: Aug. 6, 1985

[54] SPRING-LOADED GROUND ENGAGING TOOL

[75] Inventor: Douglas C. Nicholls, Yorkton, Canada

[73] Assignee: Morris Rod Weeder Co. Ltd., Yorkton, Canada

[21] Appl. No.: 554,283

[22] Filed: Nov. 22, 1983

[51] Int. Cl.³ .............................................. A01B 61/04
[52] U.S. Cl. ..................................... 172/266; 172/705
[58] Field of Search ............... 172/264, 265, 266, 267, 172/268, 705

[56] References Cited

U.S. PATENT DOCUMENTS

| | | | |
|---|---|---|---|
| 1,219,342 | 3/1917 | Myers | 172/264 |
| 3,223,175 | 12/1965 | Twidale | 172/264 |
| 3,483,930 | 12/1969 | Detwiller | 172/268 X |
| 3,529,673 | 9/1970 | Morris | 172/266 |
| 4,011,915 | 3/1977 | Anderson | 172/705 |

FOREIGN PATENT DOCUMENTS 17740 of 1928 Australia ............................. 172/267
45220 3/1917 Sweden ................................ 172/705

Primary Examiner—Richard J. Johnson
Attorney, Agent, or Firm—Schmidt, Johnson, Hovey & Williams

[57] ABSTRACT

A ground working assembly has an inclined arm swingable up and down on a tool bar of an agricultural implement, the assembly being yieldably biased downwardly by a cushioning spring associated with a bracket which mounts the assembly on the tool bar. A tool-supporting shank depending from the arm at its lower, rear end is swingable rearwardly and upwardly relative to the arm, but held against tripping by linkage which is normally locked by the spring. During encounters by the ground-working tool with usual types of ground conditions tending to cause the tool to rise against the action of the spring, the assembly merely swings upwardly relative to the bracket. But tool damage is alleviated by unlocking of the linkage and tripping of the shank when more extreme conditions, such as large rocks, are encountered by the tool.

3 Claims, 5 Drawing Figures

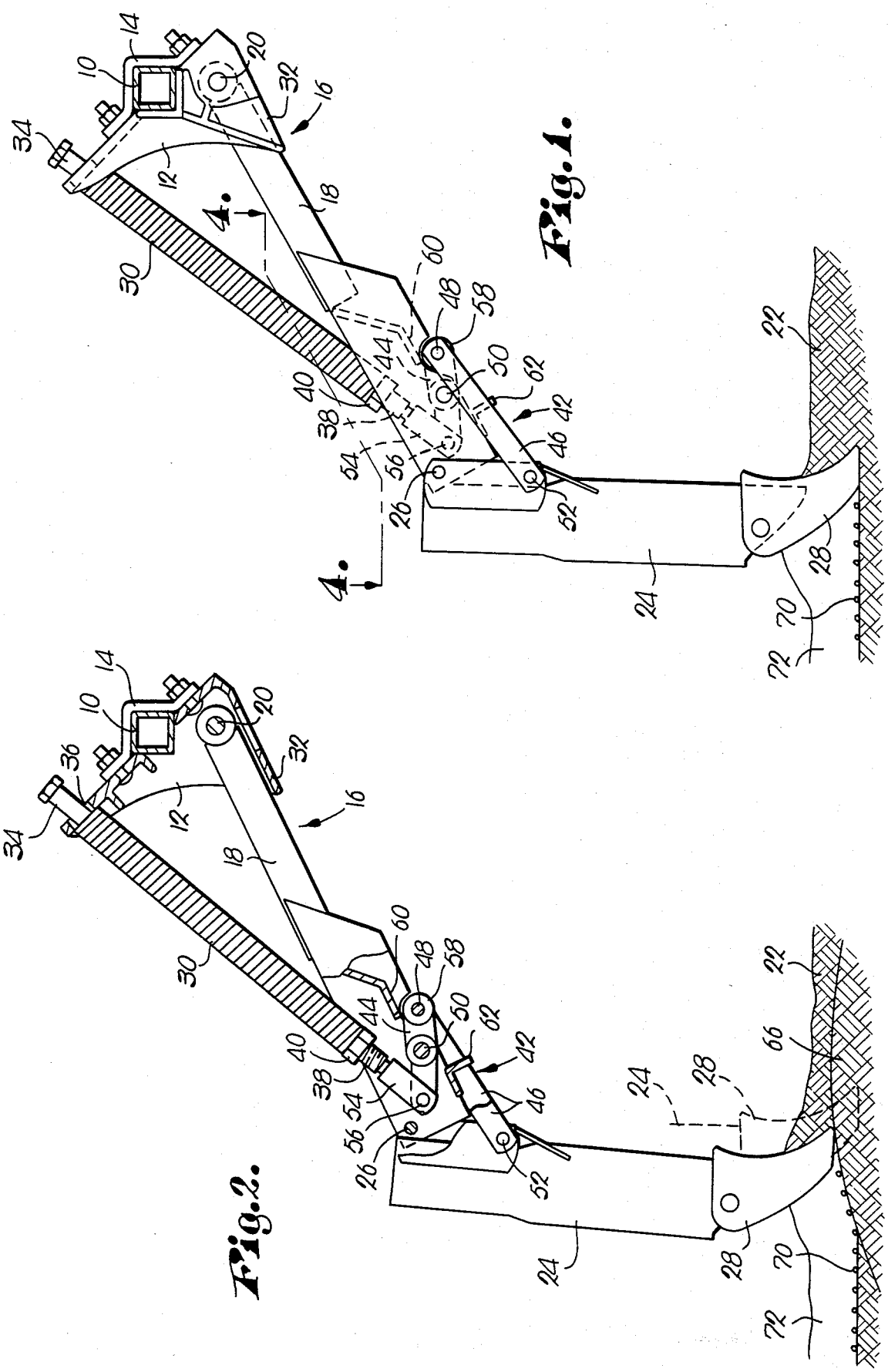

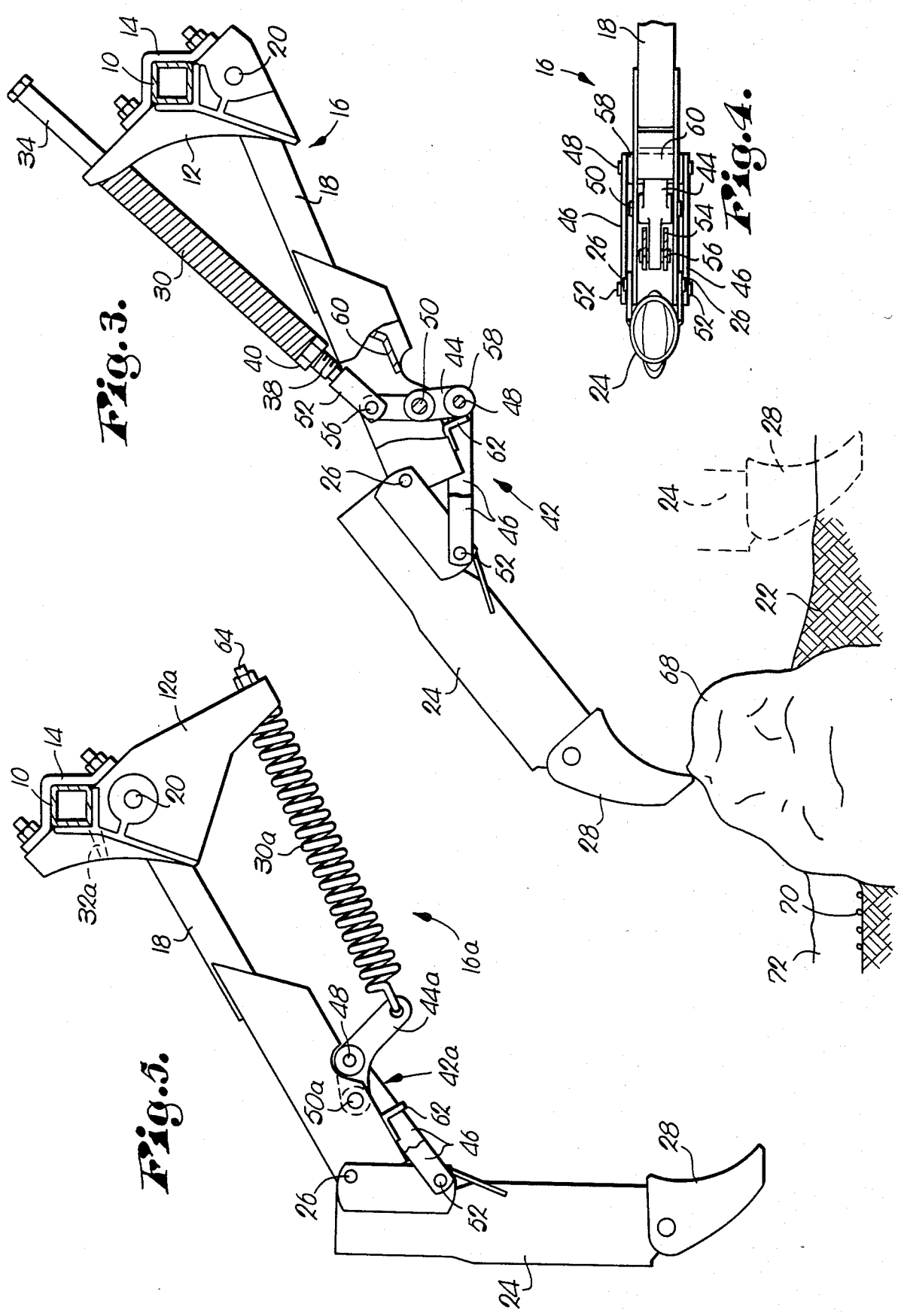

SPRING-LOADED GROUND ENGAGING TOOL

This invention relates to ground working tools of seeding machines. More specifically it relates to the mechanism of the earth working tool which applies pressure to the tool to engage with the soil and also allows the tool to ride over smaller obstacles and to clear itself by tripping when larger obstacles are encountered. The soil working tool engages the soil, prepares it for seed deposition and allows the seed to be deposited in a furrow. This soil working arrangement can properly be referred to broadly as a trip assembly. The mechanism can be used on commonly known agricultural seeding machines such as grain or seed drills, hoe drills, press drills, seed rites, disc drills or the like.

In prior art dealing with tripping devices of earth working tools, several attempts have been made to accomplish the improved results of the present invention. Canadian Pat. No. 1,058,000 describes a moldboard plow which will float over small obstacles or hard surfaces but will trip over and clear large obstacles which engage the soil working tool. It accomplishes similar objectives of the present invention with a single spring device but in an altogether different manner.

There are many models of seeding machines which use only the force applied by a spring to engage an earth working tool with the soil. If an obstacle is encountered the earth working tool will rise over the obstacle. Damage which may be caused to the earth working tool may be cushioned by the spring. Such a device on a seeding machine is shown in Canadian Pat No. 887,969. It is also shown in U.S. Pat. No. 4,337,835. This type of device provides a spring cushion action, but has limitations, especially when hoe or shovel type earth tools are used. In the event large obstacles are encountered or if the earth tool hooks an obstacle, the spring cushion is not adequate to ride over or disengage itself from the obstacle. Another disadvantage occurs because in the spring cushion system the spring must not exert excessive force onto the earth tool in order to protect the tool from damage when an obstacle is encountered. The lesser force exerted on the earth tool causes the tool to engage the soil at greatly varying depths than would be caused by a spring with a large force. The result is uneven seeding depth in soil with varying degrees of compaction.

There have been attempts to correct the problems of the spring cushion action by building earth working tools which have a relatively large cushion force to get more uniform depth control but, at the same time, cause the earth working tool to clear an obstacle which exerts a predetermined large force on the earth tool An improvement in a seeding machine to get better depth control is shown in U.S. Pat. No. 3,194,323.

Seeding mechanisms which use spring force to engage the tool with the soil for depth control and to ride over small obstacles or hard surfaces can be found in Canadian Pat. No. 714,318. The seeding mechanism also uses a tripping device to protect the earth tool from damage caused by various large and hooking obstacles. The spring cushion device of such assembly and the tripping device are separate portions of the seeding mechanism. The mechanism works well; however, it is relatively expensive to build and it is too large for some seeding machines where space is limited.

The present invention is an improvement over previous art relating to seeding equipment. The improvement performs well because it has a sufficiently large spring force to ensure that the seeding depth is uniform. At the same time it will ride over smaller obstacles or very hard surfaces. If a large obstacle is encountered or hooked, the trip assembly will trip out at a preset load thus protecting the earth working tool from damage. Performance is in a very simple manner because the spring cushion mechanism and the tripping mechanism are combined. Fewer parts are used such that the cost is significantly reduced. For example, I require only one spring whereas the invention described in Patent No. 714,318 requires two springs and several more major parts. Because of fewer parts, there is less wearing and maintenance costs are reduced.

Another feature of this invention is that it is compact, arising from the dual purpose of a single mechanism as opposed to one mechanism for a spring cushion action and another separate mechanism for a trip release action. The advantage of a compact mechanism can be appreciated by those involved in manufacturing, and using the seeding machines which are becoming increasingly complex and on which space is limited.

Yet another feature of this invention is that the spring is adjustable. If the spring force is increased to obtain a more firm spring cushion action, it will also give the trip release mechanism a high tripping load. Thus, with a single adjustment, the spring cushion action and the tripping action can be increased or decreased simultaneously. Because the trip action and the cushion action uses the same spring, the cushion force and tripping force are proportional to each other at various spring adjustments. The tripping mechanism is, therefore, designed such that it will act after the spring cushion action nears completion but may act during any position of the spring cushion action. The direction of the force on the tool 28 and shank 24 determines how much or when the spring cushion action or the tripping action are affected. The tripping mechanism can be made adjustable so that the ratio of the tripping force and cushion force can be varied.

Still another feature of this invention is that the earth working tool has a very high obstacle clearance. The tool will clear an obstacle which can be as high as the sum of the cushion action and the sum of the tripping action.

Yet another feature of the invention is that because of the position of the trip assembly pivot in relation to the earth working part or shovel of the trip assembly the mechanism can maintain a relatively consistent depth. The pivot of the trip assembly is above and ahead of the earth working part or shovel of the trip assembly. The pivot height is greater than the horizontal distance between the pivot and the shovel. If the spring cushion action is caused to be displaced several degrees backward, the variation in depth will be only a smaller portion of the displacement of the earth working tool. The earth working tool moves back at least as much as it moves up when the soil load increases pressure on the spring, helping maintain a more consistent depth. Another advantage of the high pivot point is that it can clear more trash than a machine with a low pivot.

The earth working portion of the trip assembly may be of several types. As shown, it is a shovel of the same type that would be used on a hoe press drill. Various types of shovels may be used as well as disk or lister types of openers.

In the drawings:

FIG. 1 is a side elevational view of a spring-loaded ground engaging tool made according to one embodiment of my present invention showing the same in normal operational position relative to the ground;

FIG. 2 is a view similar to FIG. 1 showing the position when yielding to conditions such as relatively hard soils;

FIG. 3 is a view similar to FIGS. 1 and 2 showing the position when yielding to conditions such as relatively large, hard obstacles;

FIG. 4 is a cross-sectional view taken on line 4—4 of FIG. 1; and

FIG. 5 is a view similar to FIGS. 1–3 showing another embodiment of the instant invention.

Referring first to FIGS. 1–4, my improvements are adapted for use with an agricultural implement having a support such as an elongated tool bar 10 capable of either being raised and lowered or rotated about its longitudinal axis through use of controls (not shown) forming a part of the implement. A mount in the nature of a bracket 12, either cast or of formed metal, extending rearwardly and upwardly from the bar 10, is releasable secured to the bar 10 by a clamp 14.

A ground working assembly 16 includes an elongated arm 18, extending at an angle downwardly and rearwardly from the bracket 12, and having a pin 20 at its upper end pivotally connecting the same to the bracket 12 for up and down swinging movement of the assembly 16 relative to the bracket 12 toward and away from the ground 22 to be worked. The assembly 16 also includes an elongated shank 24 having a pin 26 at the lower end of the arm 18 suspending the shank 24 from the arm 18 for swinging movement about an axis at its upper end parallel with the axis of swinging movement of the arm 18 transversely to the normal path of forward travel of the implement. A ground working tool 28 is joined to the shank 24 at the lowermost end of the latter.

Resilient means in the nature of a compression spring 30 between the bracket 12 and the assembly 16 yieldably biases the latter downwardly, and the bracket 12 has a stop 32 (FIG. 2) engageable by the arm 18 for limiting the extent of downward swinging movement of the assembly 16.

A guide rod 34 for the spring 30 extends slidably through an opening 36 (FIG. 2) in the bracket 12 for reciprocation relative to the bracket 12 during swinging of the assembly about the pin 20 relative to the bracket 12, the spring 30 being coiled about the rod 34 and having its upper end in abutting engagement with the bracket 12 at the opening 36. The rod 34 has external screw threads 38 receiving a nut 40 for varying the tension of the spring 30 and the lower end of the latter is in abutting engagement with the nut 40. The spring 30 and its rod 34 are disposed in overlying relationship to the assembly 16.

The shank 24 is swingable upwardly and rearwardly about the pin 26 and a releasable device 42 is carried by the assembly 16. The spring 30 has connection with the device 42 through the rod 34 such that the spring 30 yieldably holds the device 42 in a position locking the shank 24 against swinging movement relative to the arm 18.

The locking device 42 includes a pair of links 44 and 46 having a pivotal interconnection 48. A pivot pin 50 swingably mounts the link 44 on the arm 18 and a pivot pin 52 swingable connects the link 46 to the shank 26 below the pin 26. The link 46 is in the nature of a pair of straps receiving the shank 24 and the link 44 therebetween. The link 44 normally extends rearwardly from the pivot 50 (FIG. 2) and the rod 34 has a bifurcated connector 54 receiving the link 44 and pivotally connected thereto by a pin 56. A roll 58 on the pivot pin 48 normally engages a stop 60 on the arm 18 (FIG. 2) and is also engageable with a second stop 62 (FIG. 3) on the arm 18 spaced downwardly and rearwardly from the stop 60 beneath the arm 18.

In the embodiment shown in FIG. 5, a bracket 12a extends downwardly and forwardly from the bar 10 and an assembly 16a has a coil spring 30a therebeneath held in tension between the bracket 12a and a link 44a forming a part of a locking device 42a. Whereas the link 44 (FIGS. 1–4) has its pivot 50 intermediate its ends, the link 44a has pivotal connection 50a with the arm 18 at one end of the link 44a. The spring 30a is hooked at one end with the opposite end of the link 44a and the links 46 and 44a are joined by pivot pin 48 intermediate the ends of the link 44a. The upper end of the spring 30a is hooked to a fastener 64 extending through the bracket 12a at the lowermost and forwardmost end of the latter.

OPERATION

In FIG. 1, the arm 18 is yieldably held biased against the stop 32 and the roll 58 is yieldably held biased against the stop 60 by the spring 30 compressed between the bracket 12 and the link 44 at the pin 56. Such conditions will continue during normal operations as the tool 28 works the ground 22 at the depth determined by the height setting of the bar 10, or if the latter is rotatable, then by the inclination of the arm 18.

In the event the tool 28 encounters an area 66 of hardness in the ground 22 (FIG. 2) the cushioning effect of the spring 30 will continue, but it will permit the tool 28 to rise along the area 66 as the arm 18 swings upwardly away from the stop 32 about the pin 20. The tension of the spring 30 merely increases as the rod 34 slides upwardly along the opening 36. The tool 28 will still be biased downwardly along the area 66 by the increased tension in the spring 30. The device 42 will remain as in FIG. 1 with the roll 58 held even more tightly against the stop 60 by the spring 30. As soon as the tool 28 passes the area 66 all parts of the assembly 16 will return to the condition shown in FIG. 1 until the arm 18 thereof once again contacts the stop 32.

However, referring to FIG. 3, if the tool 28 encounters an obstacle 68 such as a rock, which may even rise above the surface of the ground 22 as shown, the assembly 16 will first rise in the manner shown in FIG. 2 with the arm 18 moving away from the stop 32 until the spring 30 can no longer resist the movement of the roll 58 away from the stop 60.

At that moment the link 44 swings about the pivot 50 (clockwise viewing FIGS. 1–3) from the essentially horizontal position shown in FIG. 1 to the upright position illustrated in FIG. 3 until the roll 58 comes into contact with the stop 62.

This action takes place as the tool 28 rises along the obstacle 68, swinging the shank 24 upwardly and rearwardly in relation to the arm 18 about the pivot 26. Such movement of the shank 24 exerts a pull on the link 44 at the interconnection 48 through the link 46 until the roll 58 contacts the stop 62, thereby unlocking the device 42.

After the tool 28 clears the obstruction 28 and the tripping thereof is complete, the spring 30 forces the tool 28 back into the ground 22 as shown by dotted lines in FIG. 3, and all parts of the assembly 16 return to the condition shown in FIG. 1.

In summary, the spring 30 does not have to be fully or nearly fully compressed before the device 42 is dislodged causing the shank 24 to move rearwardly. For example, if a large horizontal rearward force strikes or is hooked by the tool 28, it would cause the assembly 16 to trip with a pivoting action of the link 44 and with little spring cushion action of the arm 18. However, if the force on the tool 28 is primarily vertical and upwardly the assembly 16 will react as a spring cushion.

Also, note that as the shank 24 is tripped out over an obstacle, the forces required to move the shank 24 rearwardly become less because of the toggle arrangement of the links 44 and 46. This helps protect the assembly 16. As indicated, the tripping force of the assembly becomes greater as the spring 30 is compressed during the spring cushion action. This increased tripping force makes the tool 28 penetrate harder soils near the required seeding depth without tripping out.

The embodiment shown in FIG. 5 operates in essentially the same way except that it is the maintained tension of the spring 30a which constantly cushions the tool 28. The spring 30a will elongate as the tool 28 encounters conditions as shown at 66 in FIG. 2, and the interconnection 48 between the links 42a, 44a will not move away from the upper stop on the arm 18 (not shown in FIG. 5) until the tool encounters an obstruction 68 such as shown in FIG. 3. The tripped shank 24 will unlock the device 42a the same as above described in connection with FIG. 3 until the link 46 pulls the link 44a about its pivot 50a, limited by the stop 62. By virtue of the automatic tripping, damage to the tool 28 is reduced if not, under most field conditions, entirely eliminated, whichever of the two embodiments (FIGS. 1-4 or FIG. 5) is employed.

The bracket 12a has a lower stop (not shown) as at 32 in FIG. 2 for limiting the extent of downward swinging movement of the arm 18, and an upper stop 32a for limiting the extent of upwarding swinging movement of the arm 18.

Chosen for illustration of the principles of my invention is a shank 24 which is tubular for receiving seeds 70 (FIGS. 1-3) and depositing them behind the tool 28 in a furrow 72 opened by the shovel-like tool 28. But, of course, the assemblies 16 and 16a are adaptable for use with many other types of implements, for example, by selecting the type of shoe, shovel, hoe or other tool 28 desired and needed to cultivate or otherwise work the ground 22, in which event, the shank 24 need not be tubular. But if fertilizers, chemicals and the like are to be incorporated, the tubular nature of the shank will be retained in connection with the combined cushioning and tripping arangement of my invention.

I claim:
1. In an agricultural implement having a support, a mount;
means for securing the mount to the support; and
a ground working assembly including:
an elongated arm extending at an angle downwardly and rearwardly from said mount,
an elongated, normally upright shank,
pivot means at the lower end of the arm suspending the shank therefrom at the upper end of the shank for fore and aft swinging movement of the shank relative to the arm,
a ground working tool joined to the shank at the lower end of the latter,
a releasable locking device disposed forwardly of the shank and carried by said arm beneath the upper extremities of the latter,
said device including a pair of pivotally interconnected links,
there being an upper link and strap link,
means swingably mounting the upper link on the arm,
means pivotally connecting the strap link with the shank intermediate said ends of the shank,
said strap normally extending at an angle downwardly and rearwardly from the arm to the shank,
resilient means between the mount and the assembly yieldably biasing the latter downwardly,
said resilient means being pivotally connected to said upper link and abutting the mount, and
means at the upper end of the arm pivotally connecting the same to the mount adjacent and beneath the support for up and down swinging movement of the assembly relative to the mount toward and away from the ground to be worked,
whereby the assembly provides, in combination, cushioning of the tool during normal operation and automatic tripping of the assembly when the tool encounters obstacles in the path of the tool.

2. The invention of claim 1, said mount extending upwardly and rearwardly from the support; and a rod overlying the assembly and extending through the mount for reciprocation relative thereto during swinging of the assembly relative to the mount, said resilient means being a compressed spring coiled about the rod.

3. The invention of claim 1, said mount extending downwardly and forwardly from the support, said resilient means being a tension spring underlying the assembly and having one end thereof fastened to the mount.

* * * * *